United States Patent
Bloodworth

(10) Patent No.: US 8,447,420 B2
(45) Date of Patent: May 21, 2013

(54) METHODS FOR PREDICTING PERFORMANCE OF SPORTS PLAYERS BASED ON PLAYERS' OFFSETTING AND COMPLEMENTARY SKILLS

(75) Inventor: Diane Bloodworth, Atlanta, GA (US)

(73) Assignee: Competitive Sports Analysis, LLC, Atlanta, GA (US)

( * ) Notice: Subject to any disclaimer, the term of this patent is extended or adjusted under 35 U.S.C. 154(b) by 0 days.

(21) Appl. No.: 13/213,484

(22) Filed: Aug. 19, 2011

(65) Prior Publication Data

US 2013/0045806 A1    Feb. 21, 2013

(51) Int. Cl.
*G06F 17/00* (2006.01)
*G06F 19/00* (2006.01)
*A63F 9/24* (2006.01)

(52) U.S. Cl.
USPC ............... 700/91; 463/43; 700/92; 700/93

(58) Field of Classification Search
USPC ............... 463/2–3, 6–7, 42; 700/91–93
See application file for complete search history.

(56) References Cited

U.S. PATENT DOCUMENTS

| | | | |
|---|---|---|---|
| 6,669,565 B2 | 12/2003 | Liegey | |
| 8,099,182 B1* | 1/2012 | Kasten | 700/91 |
| 2005/0032562 A1* | 2/2005 | Osawa et al. | 463/3 |
| 2006/0183548 A1* | 8/2006 | Morris et al. | 463/42 |
| 2007/0021165 A1 | 1/2007 | Ma et al. | |
| 2007/0022029 A1 | 1/2007 | Ma et al. | |
| 2007/0244878 A1* | 10/2007 | Hulme et al. | 707/5 |
| 2008/0086223 A1* | 4/2008 | Pagliarulo | 700/91 |
| 2008/0125228 A1* | 5/2008 | Ware et al. | 463/42 |
| 2008/0281444 A1* | 11/2008 | Krieger et al. | 700/91 |
| 2009/0093287 A1* | 4/2009 | Herbrich et al. | 463/1 |
| 2009/0186679 A1* | 7/2009 | Irvine et al. | 463/16 |
| 2010/0075729 A1* | 3/2010 | Allen et al. | 463/7 |
| 2010/0100204 A1 | 4/2010 | Ng et al. | |
| 2010/0256789 A1 | 10/2010 | Miller | |
| 2010/0279774 A1 | 11/2010 | Braig et al. | |
| 2011/0237317 A1* | 9/2011 | Noonan et al. | 463/2 |
| 2012/0136463 A1* | 5/2012 | Muniz | 700/91 |

OTHER PUBLICATIONS

Owen Good, Madden NFL 12's Franchise Gets Its Upgrades—by Popular Demand, May 16, 2011, http://kotaku.com/5800955/madden-nfl-12s-franchise-gets-its-upgrades-+-by-popular-demand.*

(Continued)

*Primary Examiner* — Dmitry Suhol
*Assistant Examiner* — Jason Yen
(74) *Attorney, Agent, or Firm* — Cooley LLP

(57) ABSTRACT

A method includes receiving statistical data associated with a past performance of a player at a position at a past sporting event. The player is associated with a plurality of skills that correspond to the position of the player. Each skill has a corresponding offsetting skill and complementary skill. A skill rating is calculated for each skill based on the received statistical data and an expert's subjective input. The subjective input includes (1) an importance rating of that skill to the position of the player, (2) a predicted strength rating of the corresponding offsetting skill at a future sporting event, or (3) a predicted strength rating of the corresponding complementary skill at the future sporting event. An output associated with the calculated skill ratings is sent to an output module and is used to predict a future performance of the player at the position at the future sporting event.

12 Claims, 11 Drawing Sheets

OTHER PUBLICATIONS

EA Sports, Madden NFL 12 Online Franchise, 2011, http://www.easports.com/madden-nfl/onlinefranchise.*

Sp1ff3000, EA Blog: Superstar Mode in Madden NFL, May 17, 2011.*

Chase Becotte, Madden NFL 12: Dynamic Player Performance Cheat Sheet, Jun. 3, 2011, http://www.operationsports.com/features/1282/madden-nfl-12-dynamic-player-performance-cheat-sheet/.*

Sierra On-Line, Inc., Football Pro, 1997.*

* cited by examiner

| Opponent:<br>TENN | Situation Specific Plays: | | | | |
|---|---|---|---|---|---|
| | 1st and 15 Red Zone | 1st and Inches | 2nd and 10 | 3rd and 1 | 4th and Long |
| Scripted Plays | S UNO SL | GO UNO SL | ZN SWP NKD WK | GO UNO SL | S UNO SL |
| BUB SCRN | BNCE BT | GO UNO | ZN SWP ROLL | GO UNO | BNCE BT |
| BNCE NKO | | | | | BNCE NKT |
| ZN WK | | | | | S UNO WK |
| Z SWP | | | | | |
| BNCE BT | | | | | |
| SCRN RT 2 | | | | | |
| BNCE NKO | | | | | |
| BBPS | | | | | |
| Z SWP NKD WK | | | | | |
| Z SWP ROLL | | | | | |
| Z SWP | | | | | |
| S UNO SL | | | | | |
| GO UNO | | | | | |
| BBPS | | | | | |

METHODS FOR PREDICTING PERFORMANCE OF SPORTS PLAYERS BASED ON PLAYERS' OFFSETTING AND COMPLEMENTARY SKILLS

BACKGROUND

The invention relates generally to systems and methods for sports applications, and more particularly to systems and methods for predicting the performance of sports players for use in sports applications, such as fantasy sports applications.

Known fantasy sports applications rate sports players based on statistical data alone. Such known fantasy sports applications would rate a football quarterback, for example, based on his past passing accuracy, the number of interceptions thrown, and/or the number of field goals thrown. The quarterback's rating, however, would not take into account subjective attributes such as his arm strength or "poise in the pocket," nor would it take into account external factors such as weather conditions during a game or injuries. These subjective and external factors can significantly impact a quarterback's performance despite being excluded or discarded when calculating his rating. For this reason, the player performance predictions that fantasy sports team owners currently rely on may not provide an accurate depiction of how the player will perform in the future.

Thus, a need exists for an improved system and method for predicting performance of sports players that considers external factors beyond mere statistics when predicting the player's future performance.

SUMMARY

In some embodiments, a method includes receiving statistical data associated with a past performance of a player at a position at a past sporting event. The player is associated with a plurality of skills that correspond to the position of the player. Each skill has a corresponding offsetting skill and complementary skill. A skill rating is calculated for each skill based on the received statistical data and an expert's subjective input. The subjective input includes (1) an importance rating of that skill to the position of the player, (2) a predicted strength rating of the corresponding offsetting skill at a future sporting event, or (3) a predicted strength rating of the corresponding complementary skill at the future sporting event. An output associated with the calculated skill ratings is sent to an output module and is used to predict a future performance of the player at the position at the future sporting event.

BRIEF DESCRIPTION OF THE DRAWINGS

FIG. 11 is an example screen shot of a lineup interface according to an embodiment.

FIG. 12 is an example screen shot of a players interface according to an embodiment.

DETAILED DESCRIPTION

Systems and methods for predicting performance of sports players are described herein.

The term "fantasy sport" as used herein refers to any amateur or professional sport conducive to fantasy gaming such as, for example, football, soccer, or baseball. Such a sport can be an individual sport with only one player or a team sport with more than one player.

Figure 1:
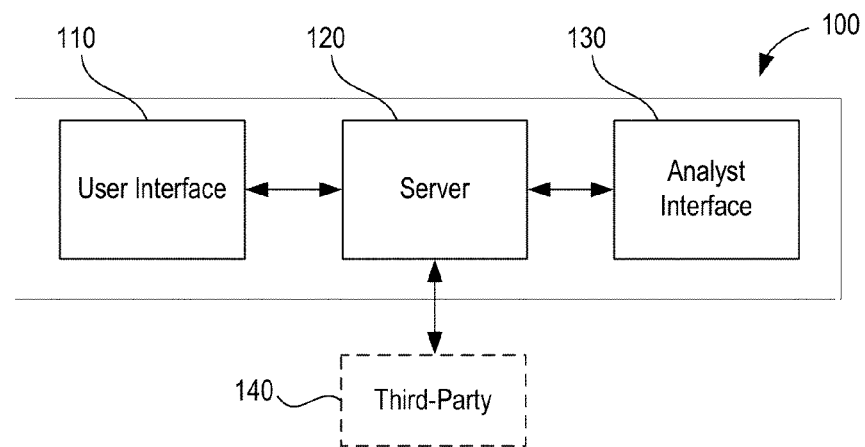
FIG. 1 is a schematic illustration of a predictive analysis system according to an embodiment.

FIG. 1 is a schematic illustration of a predictive analysis system 100 used to predict the future performances of one or more sports players. These predictions can be utilized for many different applications including, but not limited to, fantasy sports gaming and/or coaching strategy. In the fantasy sports context, a fantasy team owner can use the player performance predictions generated by the predictive analysis system 100 to aid in selection of appropriate sports players for events, such as, fantasy sports drafts, fantasy team rosters, and/or the like. In the coaching strategy context, coaches (or other like individuals) can use the player performance predictions generated by the predictive analysis system 100 to determine, for example, which team player(s) to include on the team roster against an opponent in an upcoming competitive sporting event. Generally, the predictive analysis system 100 can be used by any suitable user where selection of a team or individual sports players is involved.

The predictive analysis system 100 includes a user interface 110, a server 120, and an analyst interface 130. As will be described in more detail herein, the user interface 110 functions as part of the front-end of the system 100 and is used, for example, by the fantasy team owner discussed above. The analyst interface 130 functions as part of the back-end of the system 100 and is where system rules are defined and data relationships are created. As will be discussed in more detail herein, the user of the analyst interface 130 is not the same user as that of the front-end of the system 100.

The server 120 is configured to communicate with the user interface 110 and the analyst interface 130. Such communication can be via wired communication, wireless communication and/or the like. The user interface 110 can communicate with the analyst interface 130 via the server 120, and vice versa. In some embodiments, the server 120 can be configured to communicate with a third-party 140 that is external to the system 100. For example, as will be discussed in more detail herein, the server 120 can be configured to communicate with a fantasy sports league website maintained by a third-party.

In use, the server 120 is configured to send data, such as fantasy sports data, to the analyst interface 130 and receive input from the analyst interface 130. The analyst interface 130 is configured to display the data on a graphical user interface (GUI), such as a computer monitor. This allows a user to be able to view the data and interact with the analyst interface 130. The user can be any suitable user or administrator such as, for example, an employee of the entity maintaining the system 100 (regardless of whether the analyst has any particular sports knowledge or expertise) or a sports expert/analyst.

The analyst interface 130 is configured to facilitate defining and creating rules and/or relationships that the system 100 can use to generate player predictions. For example, at the analyst interface 130, the analyst can create relationships among the data stored within the system 100 (e.g., associate player non-specific data with player specific data based on some commonality) and/or group data as appropriate for a specific application (e.g., group offensive players separately from defensive players). The analyst can rate or rank these relationships and their overall importance to the predictions, which influences the final output produced by the system 100. The analyst can also set other ratings or rules at the analyst interface 130 that influence the final prediction output from the system 100. These ratings are described in more detail herein.

The analyst interface 130 can also be configured to import data into the system. Such data can include player non-specific data (e.g., general attributes associated with a position) and/or player specific data (e.g., statistics associated with a specific player at a position). The data can be used, for example, to update and/or replace stored data with more recent up-to-date data. Such data can be imported or otherwise uploaded to the system 100 via the analyst interface 130 in any suitable manner (e.g., as data files, manual input or download from the Internet). The analyst interface 130 is configured to transmit this data to the server 120 where it is stored for future use. In some embodiments, the analyst interface 130 can have limited or no capability to import such data into the system 100. In some such embodiments, the server 120 can collect data from third-party sources (e.g., third-party 140) or receive data through the system 100 by other means.

The server 120 is configured to execute software or computer code that implements the functions of the predictive analysis system 100. For example, the server 120 can implement any software, module (e.g., a module of computer code to be executed in hardware, or a set of processor-readable instructions stored in memory and to be executed in hardware), and/or computer code necessary for the user interface 110 and/or analyst interface 130 to operate or function. The server 120 can be any suitable server such as, for example, a database server that implements Structured Query Language (SQL). As discussed in more detail herein, the server 120 can include a computer-readable medium for storing such information as, for example, player data (e.g., player name, team name, played position, skills attributable to that played position, performance statistics, video or other media recordings of past performances, expert or analyst commentary/opinion on player's performance(s), any other relevant subjective or objective data associated with a player's performance(s), and/or the like) and team data (e.g., team name, players on team roster, offensive and/or defensive strategies of team, formations used by team, team statistics, any other relevant subjective or objective data associated with a team's performance(s), and/or the like).

Once all data is compiled in the server 120, the system 100 can use the data to generate player performance predictions. These predictions are output from the server 120 to the user interface 110, which is configured to display the output. In some embodiments, the user interface 110 is implemented as a webpage and/or is accessible through a website which may be password protected. The user at the user interface 110 can be, for example, the fantasy team owner discussed above or any other user who requires access to player performance predictions to make a player selection.

Figure 2:
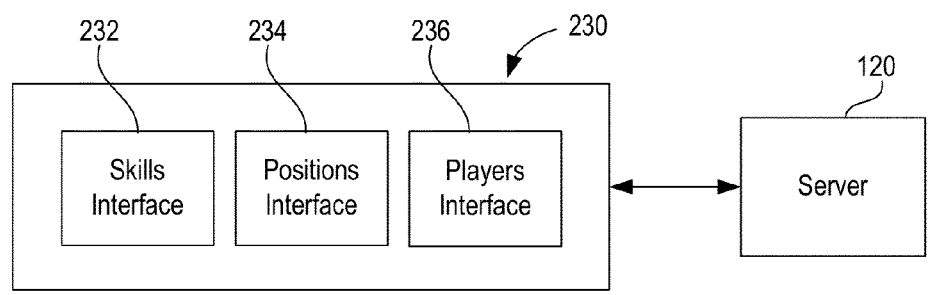
FIG. 2 is a schematic illustration of an analyst interface according to an embodiment.
Figure 3:
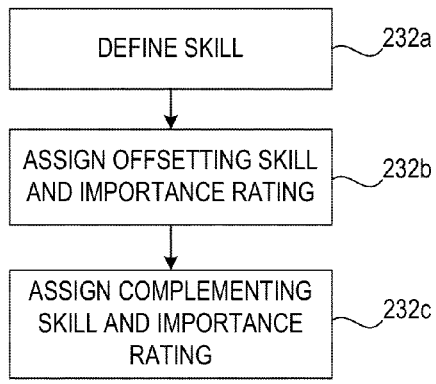
FIG. 3 is a flow chart illustrating a process for defining skills using the analyst interface shown in FIG. 2, according to an embodiment.
Figure 4:
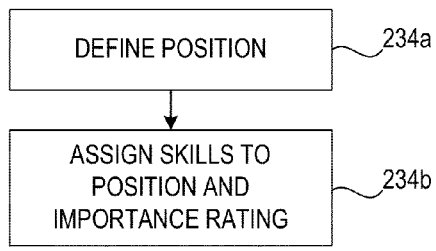
FIG. 4 is a flow chart illustrating a process for defining positions using the analyst interface shown in FIG. 2, according to an embodiment.
Figure 5:
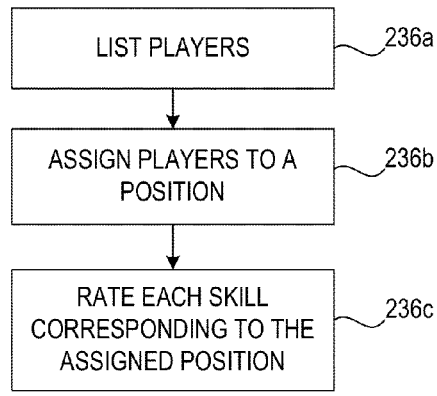
FIG. 5 is a flow chart illustrating a process for associating players with positions and skills using the analyst interface shown in FIG. 2, according to an embodiment.

FIG. 2 is a schematic illustration of an analyst interface 230 of a predictive analyst system. FIGS. 3-5 are flowcharts of the underlying processes of the analyst interface 230. The analyst interface 230 is configured to operate as part of the back-end of the predictive analysis system in a manner similar to the analyst interface 130 illustrated and described with respect to FIG. 1. The analyst interface 230 is configured to communicate with the server 120 shown in FIG. 1. Such communication can be, for example, wireless communication, wired communication, and/or the like.

The analyst interface 230 includes a skills interface 232, a position interface 234, and a players interface 236. The analyst interface 230 can be configured to operate on, for example, a personal computer, television, PDA, or any other media viewing device that are capable of displaying an interface. Each of the interfaces 232, 234, and 236 of the analyst interface 230 can be displayed or implemented, for example, as a webpage or website, or as separate GUIs within the analyst interface 230 application. Although the components (232, 234, and 236) of the analyst interface 230 are illustrated and described in FIG. 2 as being interfaces, in other embodiments, these interfaces 232, 234, and/or 236 can be modules (e.g., a module of computer code to be executed in hardware, or a set of processor-readable instructions stored in memory and to be executed in hardware). The user of the analyst interface 230 can be, for example, an analyst or other sports expert.

Figure 8A:
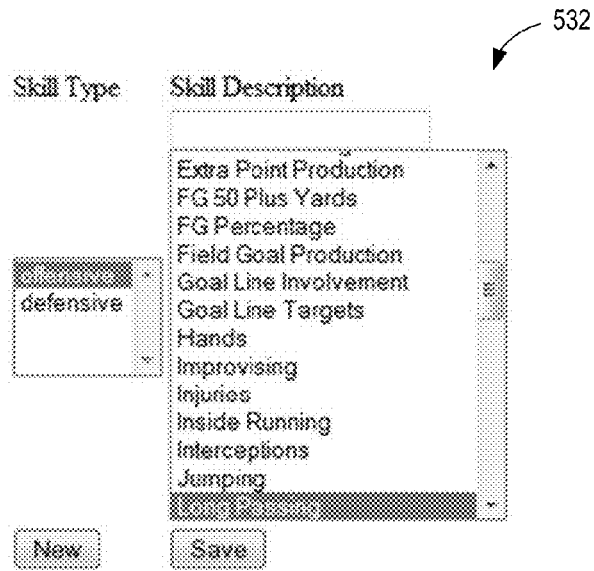
FIGS. 8A and 8B are example screen shots of a skills interface according to an embodiment.

In use, the skills interface 232 is configured to facilitate the defining and maintaining of skills data, which is used by the system to generate the player performance prediction. Skills data can refer to any information related to a skill, attribute or ability associated with a position in a sport. The process of defining skills data is discussed with respect to FIG. 3. At step 232*a* shown in FIG. 3, the skills interface 232 is configured to allow the user to input a description of a skill to generate a list of usable skills for the system. The skills can be described in any manner and can be related to any aspect of a position and/or physical attribute of a player. Examples of skills can include "interceptions", "passing accuracy", "speed", "hand coordination", "blocking", "field goal percentage" and/or the like. It should be noted that, at this point in the process, the skills are not assigned to a specific position so it is possible that any one skill can correspond or relate to more than one position. In some embodiments, the skills defined at 232*a* can be grouped into meaningful subsets, such as offensive skills or defensive skills. In some embodiments, the system includes a pre-defined list of skills such that the user does not need to enter skills into the skills interface 232 at step 232*a*. In some such embodiments, however, the user can perform the process of step 232*a* to add skills to the system at any time. An example of a skills interface at step 232*a* is illustrated in FIG. 8A.

At step 232*b*, the skills interface 232 is configured to associate each skill with one or more offsetting skills and then assign an importance rating to each offsetting skill. An offsetting skill is one that potentially counters the effectiveness of the skill. For example, an offsetting skill for the skill of "interceptions" could be "blocking" since blocking could prevent a player from achieving a successful interception. Here, the offsetting skill is attributable to the blocking skill of an opposing player or team. The offsetting skill, therefore, can become an important factor in the player performance prediction calculation when the system is comparing opposing players, as will be described in more detail herein.

In some embodiments, the user can indicate one or more offsetting skills for a particular skill via input to the skills interface 232. The skills interface 232 can then associate that particular skill with the offsetting skills when the skills interface 232 receives the input from the user. In other embodiments, the system (e.g., the server 120) can include the functionality to analyze the skills and assign offsetting skills automatically.

The importance rating of an offsetting skill is a subjective rating provided by the user (e.g., a sports analyst) that indicates the relative importance of the offsetting skill to the particular skill itself. This subjective rating is based on the user's personal experience, expertise, and/or knowledge of the sport. At this point in the process, however, the skills are still not assigned to any position or player so the importance rating is assigned based on an offsetting skill's general importance to the skill. If a particular skill has more than one offsetting skill, an importance rating is identified for each of the offsetting skills. The rating system could be any suitable rating system, such as "1" through "10" where a rating of "1" is least important and a rating of "10" is most important (see, for example, the section labeled "Relationship Importance" shown in FIG. 8B). The user can input the rating into the skills interface 232 in any suitable manner (e.g., via a check box or a text box). In embodiments where a skill does not include an offsetting skill, there is no such importance rating.

At step 232c, the skills interface 232 is configured to associate each skill with one or more complementing skills and then assign an importance rating to each complementing skill. A complementing skill is one that potentially enhances the effectiveness of the skill. For example, a complementing skill for the skill of "interceptions" could be "hand coordination" or "awareness" since these particular skills aid a player in achieving a successful interception. In some embodiments, the complementing skill could be attributable to a skill of a team member as opposed to the player himself. In such an embodiment, the system considers the fact that, in team sports, the success or ability of one player can be dependent on the ability of another player on his or her team. In the football context, the ability of a running back to gain yards (e.g., the skill of "yardage") can be dependent upon the ability of an offensive line to block (e.g., the skill of "blocking"). The complementing skill, therefore, can become an important factor in the player performance prediction calculation when the system is determining what players, for example, to include on a defensive squad (or roster) against an opposing offensive squad, as will be described in more detail herein.

The process of identifying a complementing skill and assigning an importance rating thereto can be performed in any manner described above with respect to the offsetting skill at step 232b. In some embodiments, the process does not include step 232c—i.e., no complementing skill is assigned to a particular skill.

Figure 8B:
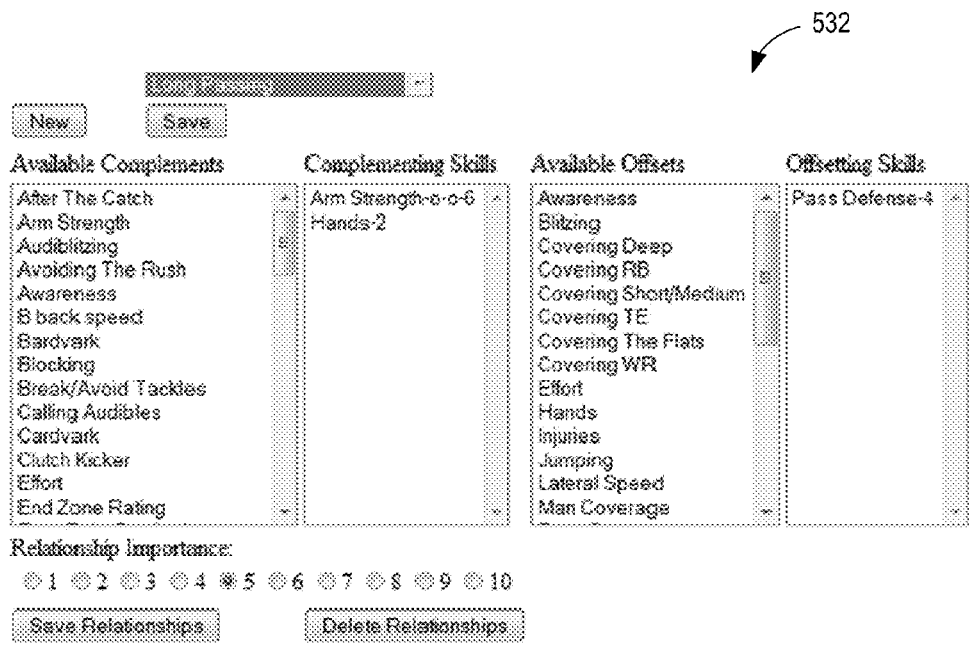

The skills interface 232 is configured to transmit the information received in steps 232a, 232b and 232c to the server 120, where it is stored for future use. More particularly, the skills interface 232 is configured to transmit any skill input by the user, any corresponding offsetting and/or complementing skill(s) associated with that skill, and any importance ratings assigned to the corresponding offsetting and/or complementing skills. The information can be transmitted in any suitable manner—e.g., at the end of all data input or periodically throughout the data input process. An example of a skills interface at steps 232b and 232c is illustrated in FIG. 8B.

Figure 9A:
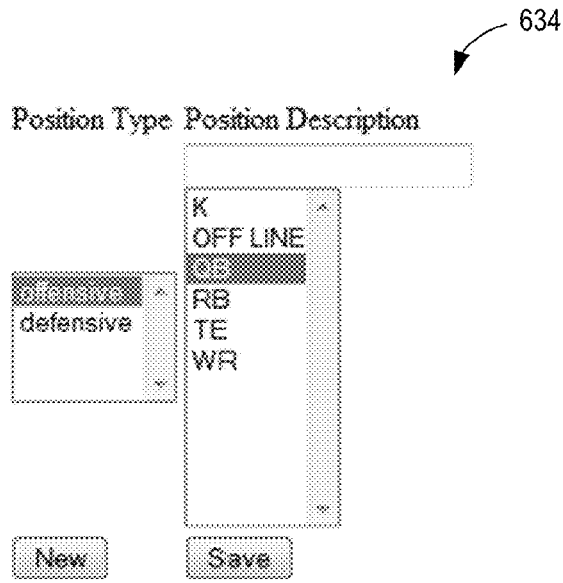
FIGS. 9A and 9B are example screen shots of a positions interface according to an embodiment.

The positions interface 234 is configured to define relationships between the listed skills and positions. This relationship-defining process is described with respect to FIG. 4. At step 234a, the user is prompted to input sports positions into the positions interface 234. In the football context, such positions could include "quarterback", "tight end", "wide receiver", etc. In some embodiments, the positions can be grouped into meaningful subsets such as offensive positions or defensive positions. This position data can be input into the positions interface 234 in any manner. For example, in some embodiments, the user can input a description of these positions into a text box of the positions interface 234. In some embodiments, the system includes a pre-defined list of positions such that the user does not need to enter positions into the positions interface 234 at step 234a. In some such embodiments, however, the user can perform the process of step 234a to add positions to the system at any time. An example of a positions interface at step 234a is illustrated in FIG. 9A.

Figure 9B:
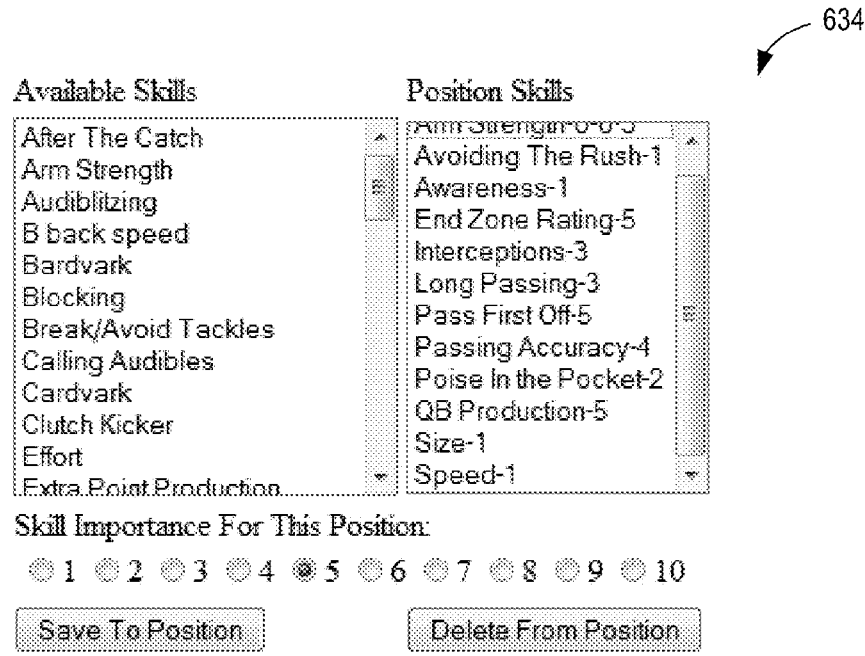

At step 234b, the positions interface 234 is configured to associate each position with one or more skills (from those listed in the skills interface 232 and/or stored in the system generally) and then assign an importance rating to each associated skill. In some embodiments, the positions interface 234 can be configured to display a list of the skills from the skills interface 232 and the user can indicate the skills for each position via input to the positions interface 234. An example of this embodiment at step 234b is illustrated in FIG. 9B (an example screen shot of a positions interface). In other embodiments, the system can include functionality to analyze the skills and assign one or more skills to a particular position automatically. In some embodiments, a single skill can be assigned to multiple positions while, in other embodiments, a skill can be assigned to only one position.

The importance rating of an associated skill is similar to the other importance ratings discussed above with respect to the skills interface 232—i.e., it is a subjective rating provided by the user (e.g., a sports analyst) that indicates the relative importance of the associated skill to the position. At this point in the process, however, the skills are still not assigned to any specific player so the importance rating is assigned based on a skill's general importance to the position. If a particular position has more than one skill assigned to it, an importance rating is identified for each of those skills. The rating system could be any suitable rating system, such as "1" through "10" where a rating of "1" is least important and a rating of "10" is most important (see, for example, the section labeled "Skill Importance For This Position" shown in FIG. 9B, which illustrates an example screen shot of a positions interface). The user can input the importance rating into the skills interface 232 in any suitable manner (e.g., via a check box or a text box).

The positions interface 234 is configured to transmit the information received in steps 234a and 234b to the server 120, where it is stored for future use. More particularly, the positions interface 234 is configured to transmit any position(s) input by the user, any skill(s) associated with the position as well as any corresponding importance ratings assigned to the associated skills. The information can be transmitted in any suitable manner—e.g., at the end of all data input or periodically throughout the data input process.

Figure 10A:
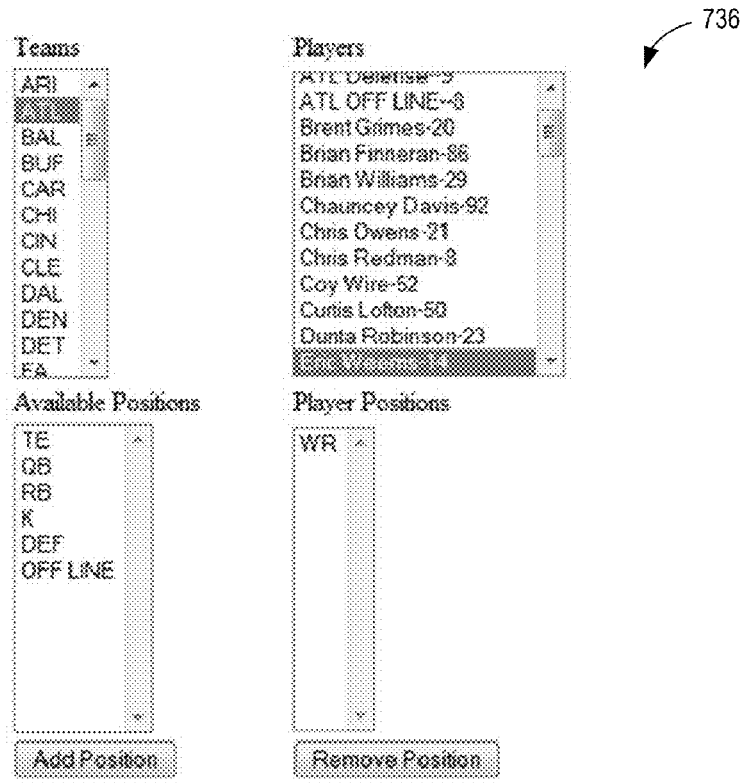
FIGS. 10A and 10B are example screen shots of a players interface according to an embodiment.

The players interface 236 is configured to define relationships between sports players, positions and skills. This relationship-defining process is described with respect to FIG. 5. First, at step 236a, the players interface 236 is configured to prompt the user to input each of the sports players into the players interface 236. In the football context, for example, each player from the National Football League is input into the players interface 236. The user can input this information in any suitable manner such as uploading one or more team rosters to the players interface 236 or manually inputting the name of each player on a team into, for example, a text box on the players interface 236. In some embodiments, the server 120 can download team rosters and/or player names from the Internet or other third-party source such that step 236a is unnecessary to initiate the process shown in FIG. 5. In some such embodiments, the functionality of the players interface 236 allows the user to input, update or edit player information (e.g., the player's name or team affiliation) at any time. The players can be grouped together in any meaningful way, such as by team. An example screen shot of a players interface at step 236a is illustrated in FIG. 10A.

Once all of the players are input into the system, the players interface 236 can assign one or more positions to each of the players, at step 236b. Due to the nature of some sports, a single player can be assigned to any number of positions; however, some players may only be assigned to one position. In some embodiments, the position(s) assigned to a particular player can be limited to the position they currently play as opposed to any position that particular player has played in the past. In such embodiments, the user can update or edit a particular player's position using the players interface 236 if, for example, the position of the player changes at any point during the season or during the player's career. In this manner, although the player may only be playing one position at any given time, the player may be assigned to more than one position. Alternatively, when a player switches positions, the players interface 236 can delete the association between the player and his previous position so that only one position is associated with the player at any given time. In other embodiments, however, the position(s) assigned to a particular player can be any position that the player has played in the past or any position that the player could potentially play in the future.

A player that is assigned to a position is automatically assigned to the one or more skills that correspond to the position (i.e., the skills that were assigned to the position at the positions interface 234). Recall that these corresponding skills also include a general importance rating that the user (e.g., sports analyst) set based on his or her expert opinion. This particular importance rating is player non-specific. At step 236c, however, the players interface 236 is configured to prompt the user to input a player-specific rating for each of the skills assigned to that player. This rating is referred to herein as a "skill level" or a "strength rating", both of which are synonymous with each other. The skill level is personal to the specific player (i.e., player-specific) and is based on the expert opinion of the user. As such, another player assigned to the same skill may have a different rating. It should be noted, however, that the importance rating of the skill (i.e., the rating assigned at the positions interface 234) remains the same for both players since this rating is player non-specific.

The skill level can be rated or ranked in any suitable manner such as a rating of "1" through "10", as described herein. The skill level can be input into the players interface 236 in any suitable manner described herein such as via a check box or a text box (see, for example, the section labeled "Skill Level" in FIG. 10B, which illustrates an example screen shot of a players interface). In some embodiments, the skills assigned to a particular player are initially assigned a default rating that can be changed by the user at any time.

The skill level assigned by the user can be based on a multitude of factors including the user's personal knowledge and expertise in a given sports area and/or player statistics from one or more previous games and/or seasons. The user can also view video recordings of the player and base his or her skill level ranking at least in part on the viewed performance. The user can look at and consider any number of sources or data when determining the appropriate skill levels for the player.

It should be understood that the rating of the skill level is an iterative process. Meaning, the skill level is continuously being re-evaluated, updated or changed based on new data. For example, during the football season, the user accesses the analyst interface 230 on a weekly basis (at least) and uploads new data into the system. Such new data can include player statistics from the most-recent football game. The analyst evaluates this new data and determines whether, based on this new data, a particular skill level assigned to the player should be adjusted upwards, downwards, or remain the same. The analyst can also adjust a particular skill level based on any corresponding offsetting and/or complementing skills as well as external factors such as weather or injuries. As such, a player's skill level may change on a weekly basis. The user can use the players interface 236 to make these adjustments to a player's skill level.

At this point in the process, the system is populated with enough information to make player performance predictions.

Figure 6:
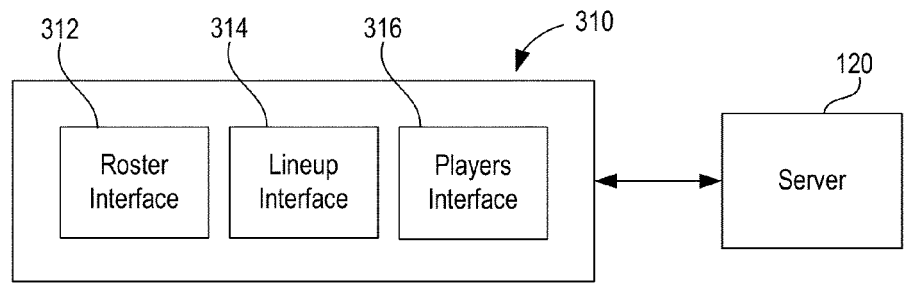
FIG. 6 is a schematic illustration of a user interface according to an embodiment.

FIG. 6 is a schematic illustration of a user interface 310 of a predictive analysis system. The user interface 310 is configured to operate as part of the front-end of the predictive analysis system and provides a user access to player performance predictions. The back-end of the system, which includes an analyst interface (e.g., analyst interface 230), is where relevant player data is entered and data relationships are created, organized and maintained. This data is used by the system (e.g., the server 120) to generate player performance predictions. The user interface 310 is the front-end tool that users access to view these player performance predictions. For purposes of this discussion these users are fantasy sports team owners (referred to herein as "team owners"). However, the present invention is not limited to use by fantasy sports team owners and may also be used by sports fans, coaches, or any other user interested in obtaining player performance predictions.

The user interface 310 is configured to communicate with the server 120 shown in FIG. 1. In this manner, the user interface 310 has access to the back-end data as well as the player performance predictions generated by the system. Such communication can be via wireless communication, wired communication, and/or the like.

The user interface 310 can be implemented, for example, as a website. In some embodiments, the user interface 310 is a GUI or other like application that the team owner can download onto his computer for use with or without internet access. In some embodiments, the team owner can only access the user interface 310 using a username and/or password. In some embodiments, the user interface 310 is part of a service and can only be accessed by a subscriber. For example, the team owner may have to pay a fee to access the user interface 310.

The user interface 310 includes a roster interface 312, a lineup interface 314, and a players interface 316. In embodiments where the user interface 310 is a website, these interfaces 312, 314 and/or 316 can be implemented as one or more webpages of the website. In some embodiments, the interfaces 312, 314, and/or 316 can be modules (e.g., a module of computer code to be executed in hardware, or a set of processor-readable instructions stored in memory and to be executed in hardware) or include modules. Each of these interfaces 312, 314, and 316 have specific functionalities and can display specific player performance predictions as discussed herein.

The roster interface 312 is configured to aid the team owner in creating a fantasy team roster. A roster is a master list of the players on a team. In one embodiment, the roster interface 312 is configured to generate a list of players that the team owner can use to select players for his roster during a fantasy sports draft. The list of players is generated by the system using the player information stored therein (e.g., skill levels, positions, etc.) and transmitted to the roster interface 312 where is it displayed for the team owner. The players in this list are predicted by the system to perform at an optimum or otherwise desired level compared to other players within the system. In some embodiments, the team owner can use the roster interface 312 in real-time during a fantasy draft to determine the next player to select for the roster based on those players that have already been selected. In some embodiments, the draft selection functionality can be separate from the roster interface 312. In some embodiments, the user interface 310 does not include draft selection functionality.

In some embodiments, the roster interface 312 is configured to receive input from the team owner regarding a previously created roster. For example, at the time the team owner accesses the roster interface 312, the team owner could have already selected players for his team roster in a fantasy draft. The team owner can input this roster into the roster interface 312 in any suitable manner. For example, the roster interface 312 can display a list of the players stored within the system and the team owner can select the players from the list that are part of his fantasy team roster. Alternatively, the team owner can upload a data file with the roster to the roster interface 312. The roster interface 312 is configured to transmit the roster input to the server 120 for storage and future use by the system.

Once a roster is entered into the system, the roster interface 312 can display data associated with each of the players on the roster. This data can include the name of the players on the roster, the positions of the players on the roster, the teams of the players on the roster, the playing status of the players on the roster (e.g., "active" or "inactive"), and/or any other data entered at the back-end of the system or generated by the system. The data can also include player performance predictions such as the skill ratings of the players on the roster. A "skill rating" can be a player's overall rating for a particular skill, and can be calculated by multiplying the skill level and the importance rating assigned to the particular skill. An "overall skill rating" refers to the player's overall skill rating at a particular position. The overall skill rating can be calculated by summing together all of the individual skill ratings for each skill assigned to the player. In general, the overall skill rating for each player is represented by a single number.

The data associated with the team owner's roster can be used by the system to produce an optimal lineup for an upcoming event against an opponent. The lineup is a list of players that the system determines should start at the upcoming event. The lineup interface 314 is configured to display the optimal lineup generated by the system (e.g., the server 102). The system can determine and generate this lineup based on a variety of factors including players' skill ratings, an opponent (including, for example, an opponent's skill ratings), the weather, and injuries.

The players interface 316 is configured to display performance predictions and other information related to specific players. Such information can include the name of the player, the position played, the team name, the skills associated with the position including the importance rating, the skill level or any other rating associated with the skill, and/or the like. These players can be the players on the team owner's rosters or can be other players that are not on the team owner's roster. In some embodiments, the players interface 316 can display a list of the players that are stored within the system and the team owner can select the player whose information the team owner wants to view. The information can be displayed on the players interface 316 in any suitable manner such as, for example, in the form of spreadsheets, lists, charts, and/or the like.

Figures 11, 12:
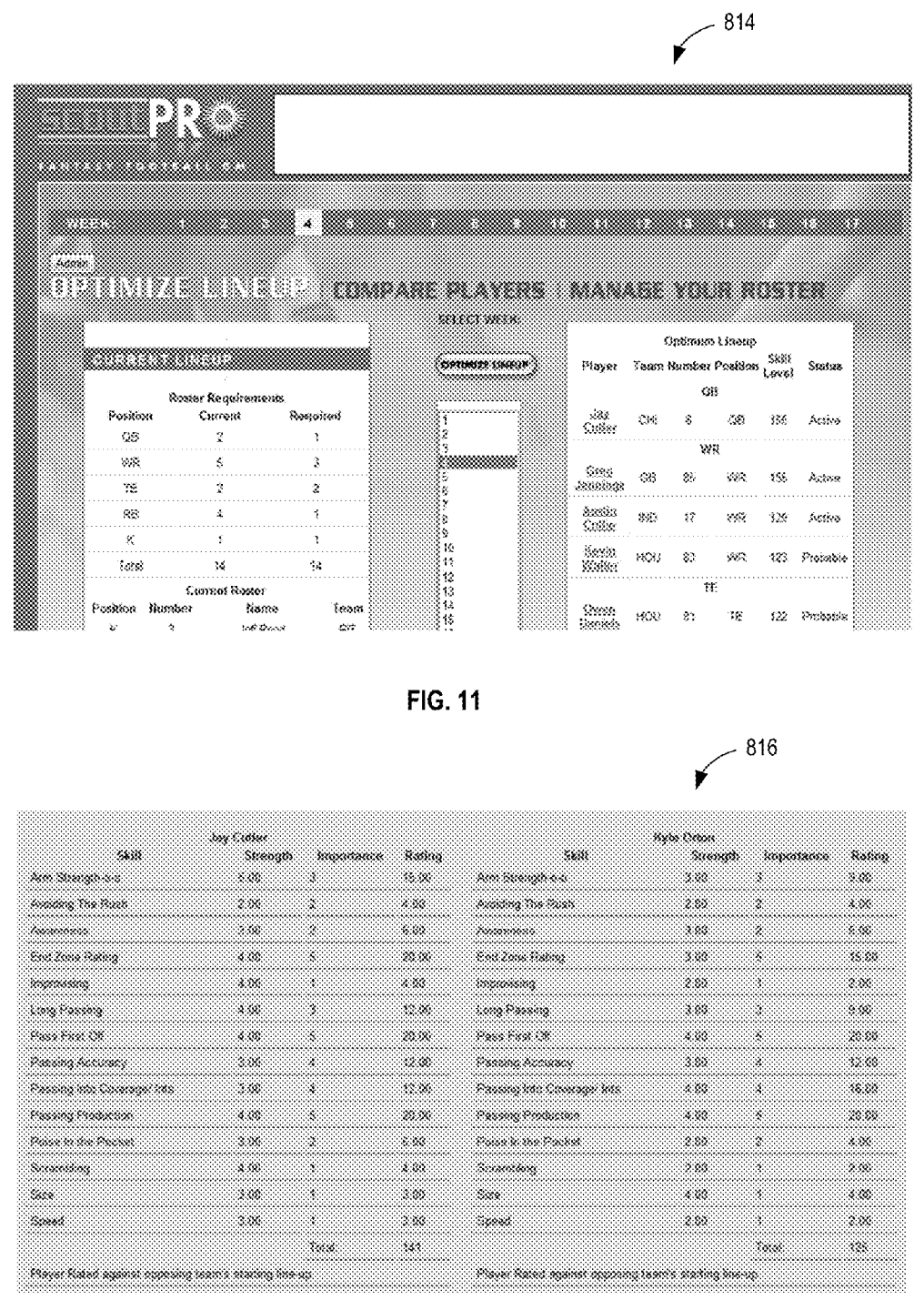

The players interface 316 can also display a comparison of one or more players. In other words, the players interface 316 can display the performance predictions of one or more players. Such a display can be particularly helpful when the team owner is trying to decide which player to assign to a particular position in his lineup or to his roster. An example of this functionality is shown in FIG. 12, which illustrates a side-by-side comparison of two quarterbacks. In some embodiments, the players interface 316 can only compare players that are listed on the user's roster. In other embodiments, however, the players interface 316 can include a list of any of the players stored within the system. The user can select one or more players from the list and the players interface 314 will display information related to those selected players accordingly.

Although the user interface 310 is illustrated and described as having the roster interface 312, the lineup interface 314, and the players interface 316, it should be understood that these interfaces are for illustrative purposes only. In some embodiments, the user interface 310 can have any number of interfaces with any number of functionalities. For example, in some embodiments, the user interface 310 can include an interface and/or functionality that prompts the server 120 to download information from third-party websites such that the downloaded information is displayed on the user interface 310 and/or used by the system (i.e., server 120) to generate a player performance prediction. In one example, the user can be a fantasy football team owner that plays in a fantasy football league hosted, for example, by ESPN. The server 120 can access the fantasy team owner's account through the ESPN website and download the relevant information from the account (e.g., the list of players drafted by the owner). This information can then be used by the server 120 to more quickly and efficiently generate player performance predictions. This process can be used in lieu of or in conjunction with the user manually selecting the players from the master player list in the system. In some embodiments, after the system generates the player performance predictions, the user can select the players for his roster using the user interface 310 and the user interface 310 and/or the server 120 can upload the roster information to the user's account at the ESPN website.

Figure 7:
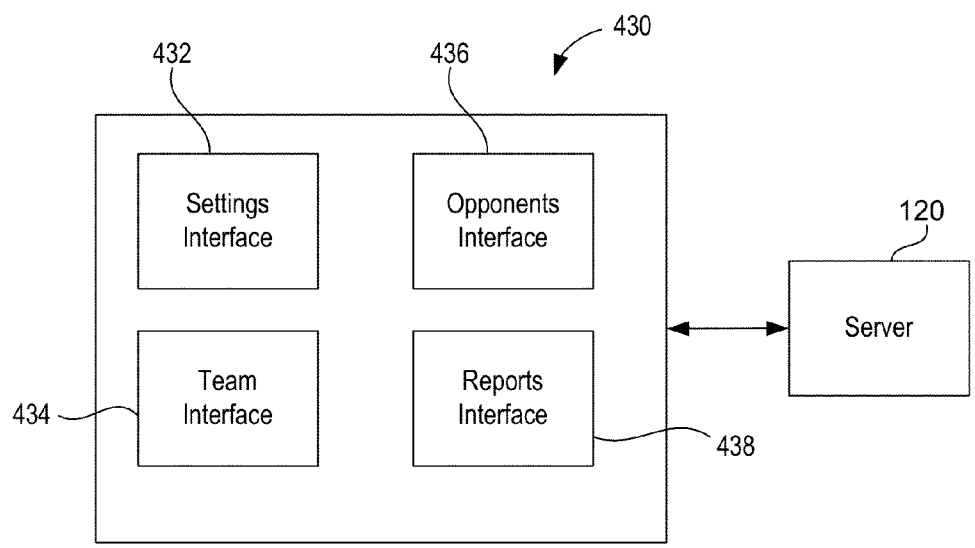
FIG. 7 is a schematic illustration of a coaching interface according to an embodiment.

FIG. 7 is a schematic illustration of a coaching interface 430 of a predictive analysis system. The coaching interface 430 is configured to be used by coaches or other qualified individuals to analyze player performance and to determine an optimum lineup against a particular opponent. In some embodiments, the coaching interface 430 can include one or more of the functionalities of an analyst interface (e.g., analyst interface 230) of the predictive analysis system. In some embodiments, the coaching interface 430 is the sole module of the predictive analysis system. As such, no analyst interface or user interface is needed.

The coaching interface 430 is configured to communicate with the server 120 shown in FIG. 1. In some embodiments, however, the system does not include the server 120. Rather, the system can include a database that communicates with the coaching interface 430 and stores all the data input into the system via the coaching interface 430.

The coaching interface 430 includes a settings interface 432, a team interface 434, an opponents interface 436, and a reports interface 438. The settings interface 432 can include one or more of the functionalities of the analyst interface 230 described with respect to FIG. 2. More particularly, using the settings interface 432, a user can define skills and positions, associate skills with positions, upload player information, associate players with positions, and otherwise create rules and relationships among data stored within the system. The settings interface 432 can also allow the user to define situation specific parameters. A situation specific parameter refers to specific game situations that can affect, for example, what play a coach calls. In the football context, a situation specific parameter can include, for example, a "1st and inches" parameter which can limit use of a certain play to that specific game situation when there is a first down and the ball is inches from the goal line. Examples of other parameters include "1st and 15 in the Red Zone", "4th and Long" and/or any other game-specific situation that can effect the type of play called and/or a player's performance. The coaches and/or other analysts or experts can also use the settings interface 432 to assign subjective ratings such as importance levels or skill levels. These ratings can be adjusted at any time based on other factors such as weather as discussed above. These ratings can also be used to calculate a skill rating for a particular skill and/or an overall skill rating for a player as also discussed above.

Figures 13, 14:
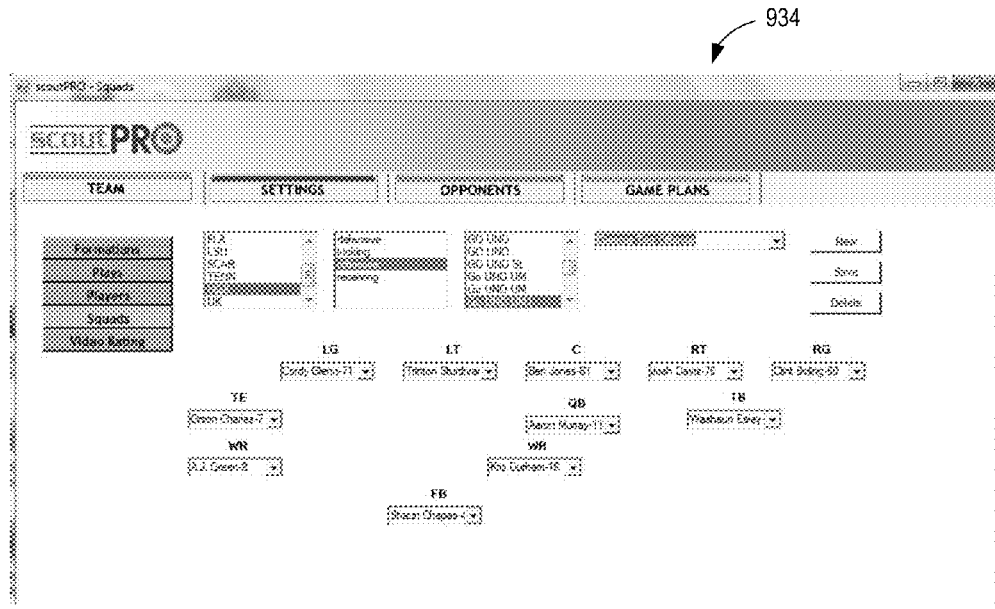
FIGS. 13 and 14 are example screen shots of a coaching interface according to an embodiment.

The team interface 434 is configured to receive team-specific information input or imported by the user. Such team-specific information can include player positions, player statistics, video clips or records and other like data that can be used to analyze and rate players. In some instances, the coach can upload the team's playbook to the team interface 434. The plays used by the team can, therefore, become a factor for predicting a player's performance. For example, the system can predict which players are best suited to run a specific play and/or determine which plays are best suited for a particular lineup. An example screen shot of a team interface of a coaching interface is illustrated in FIG. 13.

The opponents interface 436 is configured to receive opponent-specific information input or imported by the user. Such opponent-specific information can include opponent-player data or statistics, formations used by the opposing team, and other relevant data. In some embodiments, an analyst separate from the coach subjectively rates players and teams in the manner described with respect to the analyst interface 230— the opponents interface 436 can include these ratings. In some such embodiments, however, the coach can adjust the ratings of the players on his team using the settings interface 432 without impacting the ratings assigned by the analysts.

The reports interface 438 is configured to generate reports and player performance predictions once all the relevant information is uploaded into the system and the rules and relationships are created at the settings interface 432. The reports generated by the reports interface 438 can be displayed at the reports interface 438 in any suitable manner. The reports can include a list of specific plays that have a high probability of success against an opponent, an analysis of the opponents including opponents strengths and weaknesses, a list of players to include in a lineup against the opponents, and/or the like. The reports interface 438 can also generate a report comparing a proposed lineup, such as, for example, a defense lineup, to the opposing team's offense lineup. Further, the reports interface 438 can provide detailed information and player performance predictions for one or more players, including a comparison of individual players. The system generates these reports by analyzing a multitude of factors including the skill levels assigned to team players at a position, the skill levels assigned to opposing players at an opposing position, any offsetting or complementing skills attributable to the position, the team player, or any opposing player, and/or any other relevant data. An example screen shot of a reports interface of a coaching module is illustrated in FIG. 14.

It should be understood that the system described herein is flexible and can be customized to suit the specific needs of the coach. For example, in some embodiments, the coaching interface 430 can be divided into more than one interface such as a defensive coaching interface and an offensive coaching interface. These interfaces can include specific functionality geared to a more particular aspect of the game (i.e., offense or defense).

In other embodiments, the coaching interface 430 can include an interface that allows the user to input recruiting data—e.g., a recruit's position(s), statistics, video clips or records and other like data that can be used to analyze and rate that recruit. In this manner, the coaching interface 430 can use the system to predict how well a recruit would adapt to that team's playing style and/or interact with other players on the field.

FIGS. 8A and 8B are example screen shots of a skills interface 532 of a predictive analysis system. FIG. 8A specifically shows a listing of the offensive skills stored within the system. Using the skills interface 532, a user, such as an analyst, can input new skills into the system or edit skills that are already stored within the system. As shown in FIG. 8B, the skills stored within the system can be associated with corresponding complementing skills and/or offsetting skills. More specifically, the skill of "long passing" is illustrated in FIG. 8B as being associated with the complementing skills "arm strength" and "hands" as well as being associated with the offsetting skill of "pass defense." Each of the complementing skills and the offsetting skill have been assigned an importance rating (e.g., "hands" has a rating of "2").

FIGS. 9A and 9B are example screen shots of a positions interface 634 of a predictive analysis system. FIG. 9A shows a listing of the offensive positions that are stored within the system. A user can input new positions into the system or edit positions already stored within the system, for example, using the text box located below the label "Position Description." FIG. 9B lists the available skills that were entered into the system, for example, at the skills interface 532 shown in FIG. 8A. The user can, for example, drag and drop one or more the skills from the "Available Skills" list into the "Position Skills" list as necessary. The skills moved to the "Position Skills" list become associated with the designated position, which is the highlighted position labeled "QB". Each skill that is moved into the "Position Skills" list is assigned a skill importance rating, which is indicated to the right of the skill. For example, the skill "awareness" has been assigned the skill importance rating of "1".

Figure 10B:
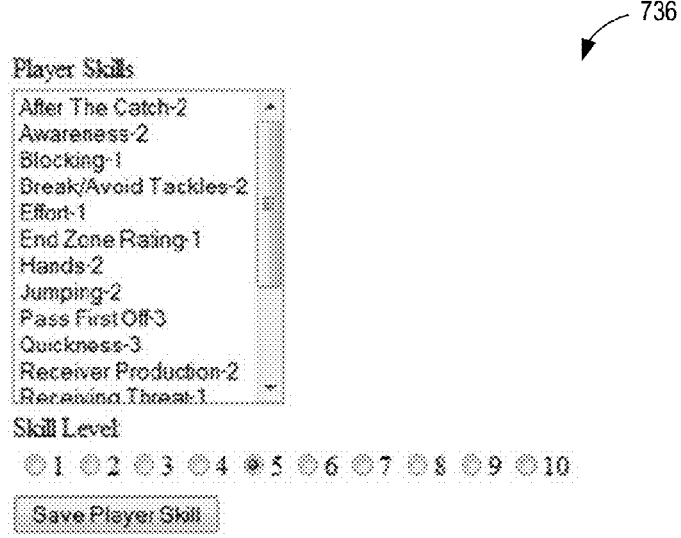

FIGS. 10A and 10B are example screen shots of a players interface 736 of a predictive analysis system. FIG. 10A shows a listing of the "Teams", "Players", "Available Positions", and "Player Positions" that are stored within the system. The players are already associated with a team as indicated in FIG.

10A but, using the players interface 736, a user can further associate a player with a position. The highlighted player, Erik Weems, for example, is associated with the position labeled "WR". FIG. 10B shows a listing of the player skills that are associated with the selected position. As discussed above, once a player is associated with position, he is automatically associated with the skills that were assigned to the position (e.g., in positions interface 634 shown in FIG. 9B). The user can assign a skill level to the player skill. This skill level rating is a player-specific rating and, thus, will only used by the system when evaluating this particular player.

FIG. 11 is an example screen shot of a lineup interface 814 of a predictive analysis system. The interface 814, which is implemented as a web page of a website, displays an optimum lineup for the user based on his roster. As shown in FIG. 11, the user can optimize a lineup based on the game week. Here, week 4 is selected and an optimized lineup is generated and displayed on the interface 814 for that week. As discussed above, when the system generates an optimized lineup, it considers numerous factors including the opponents that the players on the roster will face during that week's game. As such, this lineup is subject to change from week to week.

FIG. 12 is an example screen shot of a players interface 816 of a predictive analysis system. The interface 816, which is implemented as a web page of a website, displays a comparison of two players that the user has selected to view. This side-by-side comparison allows the user to conduct a detailed analysis of these players down to a more granular level. As shown in FIG. 12, each player is associated with a list of skills that have a corresponding importance rating, strength rating (i.e., skill level), and skill rating, which is the product of the importance rating and the strength rating. Furthermore, each player is associated with a single overall skills rating (designated by "Total") that is the sum of the individual skills ratings. This particular function provided by the players interface 816 in FIG. 12 can aid the user, for example, in determining which quarterback on his roster to play in the upcoming game. It should be noted that, in some embodiments, the interface 816 can allow the user to select and compare any player(s) that is(are) stored in the system but is(are) not necessarily on the user's roster.

FIGS. 13 and 14 are example screen shots of a coaching interface according to an embodiment. More particularly, FIG. 13 is an example screen shot of a team interface 934, which is part of the coaching interface. In this interface 934, the coach can assign players to positions on a squad, which in this example is the offensive squad. Once players are assigned positions, the coach can, for example, run game plans to determine the effectiveness of the squad and/or query the system to produce a list of game plans that have the highest potential rate of success with the selected group of players.

FIG. 14 is an example screen shot of a game plan report 938, which can be generated, for example, by the reports interface 438 illustrated and described with respect to FIG. 7. The report 938 lists the recommended plays to be used against the named opponent in the upcoming game. The report 938 also indicates which plays from that list would be most effective against the opponent in game specific situations (e.g., "1st and Inches").

Figure 15:
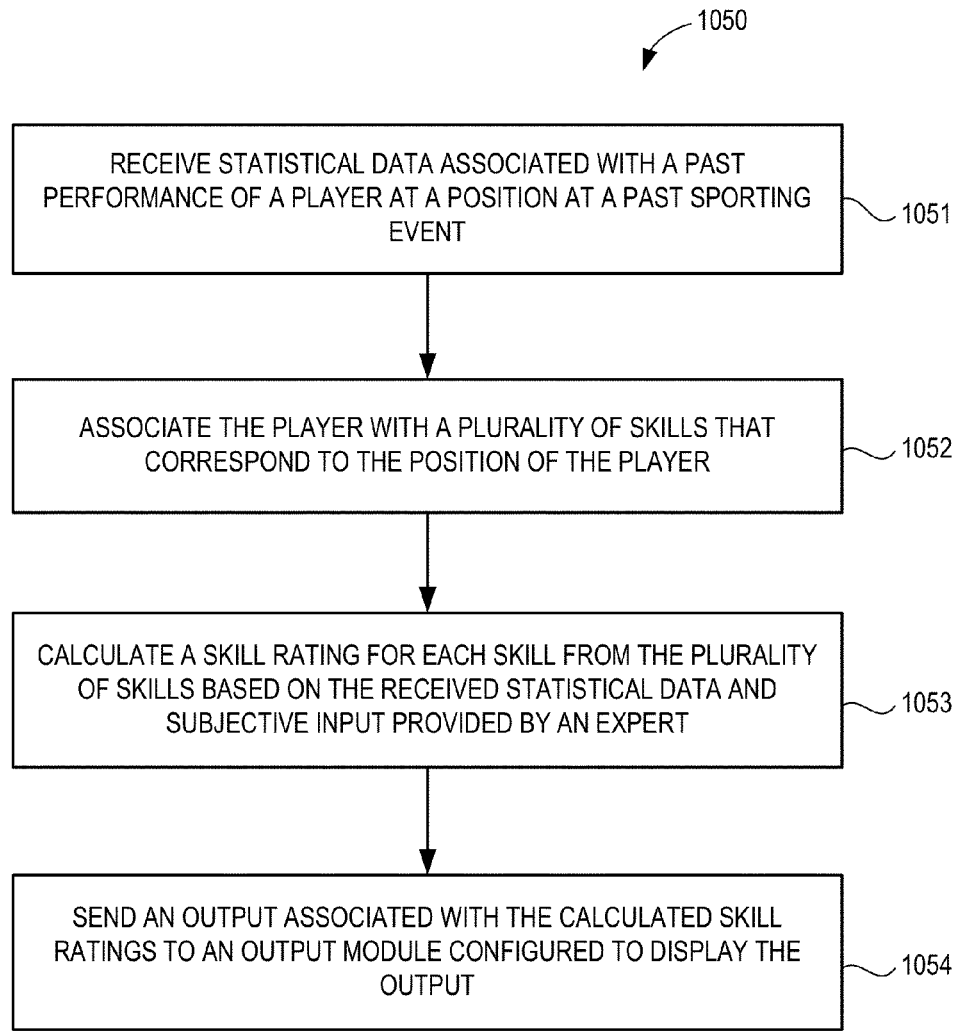
FIG. 15 is a flow chart illustrating a method for calculating a skill rating for a fantasy sports player using a predictive analysis system, according to an embodiment.

FIG. 15 is a flow chart illustrating a method 1050 for calculating a skill rating for a fantasy sports player using a predictive analysis system. The method includes receiving statistical data associated with a past performance of a player at a position at a past sporting event, 1051. The sporting event can be any sporting event such as a football game, soccer game, baseball game, hockey game or any other suitable game. The game itself can include scrimmages, pre-season games, regular season games, or post-season games. In some embodiments, the statistical data can include data related to at least one of the past performance, a performance of another player at the past sporting event, a team performance, environmental factors, and play formations. In this manner, the statistical data includes not only data related to the player's actual performance but also data related to surrounding factors that may contribute to the player's performance. The statistical data can be received by the system in any suitable manner described herein. For example, in some embodiments, the statistical data can be received by an analyst interface such as the analyst interface 230 described in FIG. 2.

The player is associated with a plurality of skills that correspond to the position of the player, 1052. As discussed herein, each skill from the plurality of skills has a corresponding offsetting skill and a corresponding complementary skill. The skills can be any one of the skills illustrated and/or discussed above. In some embodiments, an analyst or other subject matter expert can select which skill is corresponding offsetting skill and/or corresponding complementary skill. In some embodiments, a skill from the plurality of skills can have more than one corresponding offsetting skill and/or corresponding complementary skill. In some embodiments, a skill from the plurality of skills does not have a corresponding offsetting skill. In some embodiments, a skill from the plurality of skills does not have a corresponding complementary skill.

A skill rating is calculated for each skill from the plurality of skills based on the received statistical data and subjective input provided by an expert, 1053. The subjective input includes an importance rating of that skill to the position of the player, a predicted strength rating of the corresponding offsetting skill of that skill at a future sporting event, or a predicted strength rating of the corresponding complementary skill of that skill at the future sporting event. In the embodiments discussed above, the importance rating assigned to each of the offsetting and/or complementary skills can be equivalent to the "strength rating".

In some embodiments, the skill rating is calculated for each skill from the plurality of skills based on the received statistical data, subjective input provided by the expert, and a selected fantasy team scoring system.

In some embodiments, the predicted strength rating of the corresponding offsetting skill is calculated for each skill from the plurality of skills based on a skill rating of an opposing player at the future sporting event and the received statistical data. Likewise, in some embodiments, the predicted strength rating of the corresponding complementary skill is calculated for each skill from the plurality of skills based on a skill rating of a supporting player at the future sporting event and the received statistical data. In each instance, the system considers external factors that may detriment or enhance a player's performance.

An output associated with the calculated skill ratings is sent to an output module configured to display the output, 1054. The output is used to predict a future performance of the player at the position at the future sporting event. The output module can be, for example, a user interface such as the user interface 310 illustrated and described above with respect to FIG. 6. The output can be displayed at the output module in any manner such as in the form of charts, spreadsheets, lists, and/or the like. A user, such as a fantasy sports team owner, can use the output prediction to select fantasy players for a lineup in an upcoming game. Such a user could also use the output prediction to select fantasy players for a roster at a fantasy draft. Moreover, in some embodiments, the user is a coach that can use the output prediction to select players for a lineup against an opponent in an upcoming game.

In some embodiments, the method can further include calculating an effectiveness rating for the player based on each skill rating calculated. As such, the output can be associated with the calculated skill ratings and the calculated effectiveness rating. This effectiveness rating can also be referred to as an overall skill level rating for the player. An example of an effectiveness rating is illustrated in FIG. 12 as designated for each player by the label "Total". As shown in FIG. 12, the effectiveness rating can be calculated by multiplying the strength predictions and importance ratings for each skill to produce a rating for each skill, and then summing together the skill ratings to produce a single effectiveness rating for the player at the position. In this manner, a user can view the overall effectiveness rating of a player as well as each of the granular skill ratings for the player.

In some embodiments, the past performance discussed with respect to the above method 1050 is a first past performance, the past sporting event is a first past sporting event, and the subjective input is a first subjective input provided by the expert based on the first past performance. In some such embodiments, the method can further include receiving statistical data associated with a second past performance of the player at the position at a second past sporting event. As such, the skill rating is calculated for each skill from the plurality of skills based on the received statistical data associated with the first past performance, the received statistical data associated with the second past performance, the first subjective input, and a second subjective input provided by the expert based on the second past performance. In this manner, a skill rating is re-calculated each time new data (e.g., statistical data) is received by the system. Likewise, the expert provides new or updated input on the skill rating each time new data is added to the system. This particular embodiment illustrates that the system and the data therein is continuously being updated and refined. Thus, the predictive analysis system can utilizes the most accurate and up-to-date data to predict a player's future performance.

Figure 16:
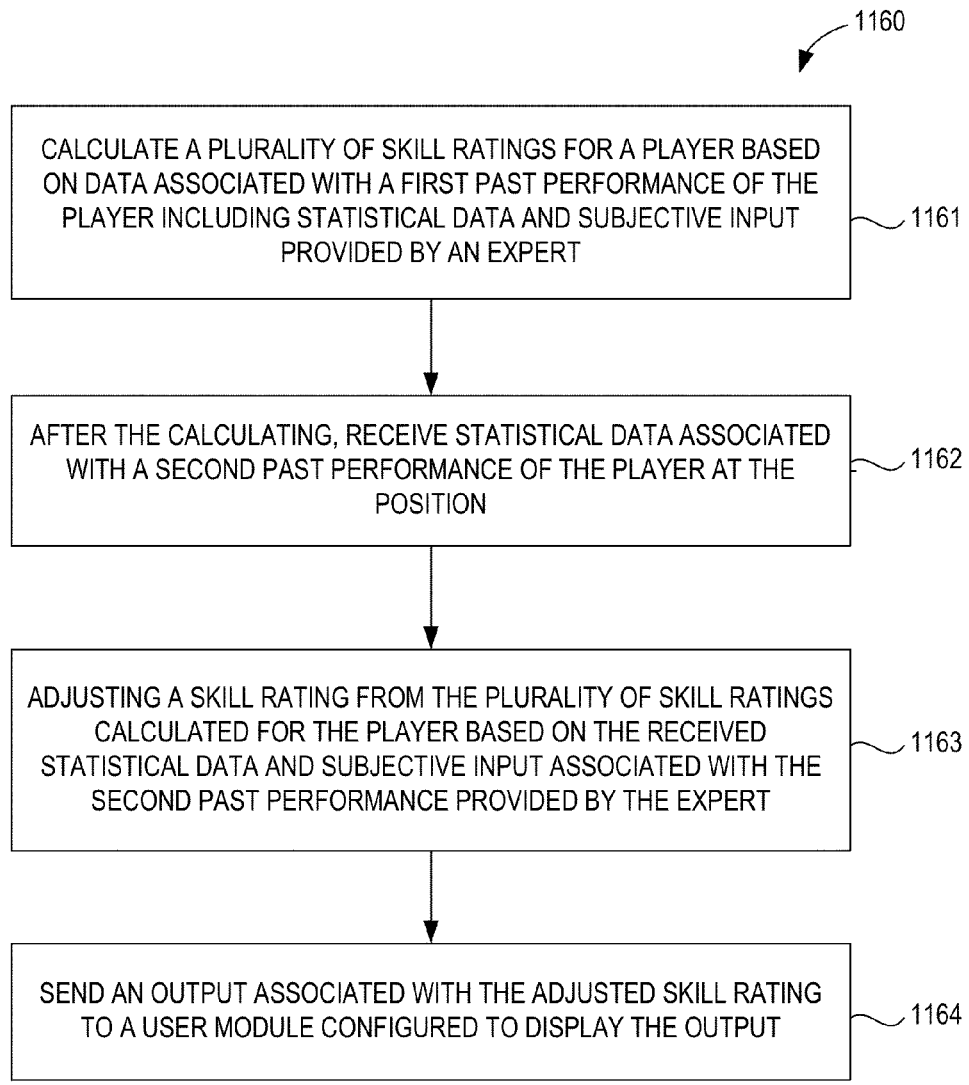
FIG. 16 is a flow chart illustrating an alternative method for calculating a skill rating for a fantasy sports player using a predictive analysis system, according to an embodiment.

FIG. 16 is a flow chart illustrating an alternative method 1160 for calculating a skill rating for a fantasy sports player using a predictive analysis system. The method includes calculating a plurality of skill ratings for a player based on data associated with a first past performance of the player including statistical data and subjective input provided by an expert, 1161. Each skill rating from the plurality of skill ratings corresponds to a skill of the player at a position. The skill ratings can be calculated in any suitable manner, such as the manner described be with respect to method 1050 shown in FIG. 15.

After the plurality of skill ratings are calculated, statistical data associated with a second past performance of the player at the position is received, 1162. In some embodiments, the statistical data includes data related to at least one of the second past performance, a performance of another player, a team performance, environmental factors, and play formations. The statistical data can be received by the system in any suitable manner described herein. For example, in some embodiments, the statistical data can be received by an analyst interface such as the analyst interface 230 described in FIG. 2. Additionally, the statistical data can be received, for example, by the system, at any time after the plurality of skill ratings are calculated. For example, in the fantasy football context, the plurality of skill ratings can initially be calculated at 1161 after the first week of the football season and then the statistical data can be received at 1162 after the second week of the football season. In this manner, the first past performance can relate to the player's performance in the first game of the season and the second past performance can relate to the player's performance in the second game of the season.

A skill rating from the plurality of skill ratings calculated for the player is adjusted based on the received statistical data and subjective input associated with the second past performance provided by the expert, 1163. The subjective input associated with the second past performance includes an offset skill rating associated with a skill of another player and a complementary skill rating associated with a skill of another player. In some embodiments, the other player for which the offset skill rating is associated is an opposing player from, for example, an opposing team. In some embodiments, the other player for which the complementary skill rating is associated is a player from the player's team. In some embodiments, the subjective input associated with the second past performance does not include the complementary skill rating. In some embodiments, the subjective input associated with the second past performance does not include the offset skill rating.

In some embodiments, the skill rating can be adjusted using an analyst interface, such as the analyst interface 230 illustrated and discussed above with respect to FIG. 2. Continuing with the fantasy football example, in some embodiments, the skill rating can be adjusted at 1163 after the second week of the football season such that the skill rating considers the player's performance in the first game and the second game of the season. As discussed herein, the skill rating can also be adjusted at 1163 after the second week of the football season based on the player's future opponent in the third week of the season.

An output associated with the adjusted skill rating is sent to a user module configured to display the output, 1164. The output is used to predict a future performance of the player at the position. The user module can be, for example, the user interface 310 illustrated and described above with respect to FIG. 6. In some embodiments, the user module can be a third-party fantasy sports website. The output can be displayed at the user module in any manner such as in the form of charts, spreadsheets, lists, and/or the like. The output can be used for any suitable purpose, including those discussed above with respect to FIG. 15.

In some embodiments, the player is a fantasy sports player and the output can be sent to the user module when the player is selected from a plurality of fantasy sports players displayed on the user module. In some such embodiments, the player is added to a fantasy team roster when the player is selected from the plurality of fantasy sports players displayed on the user module.

In some embodiments, the method can further include calculating an effectiveness rating for the player based on each adjusted skill rating. The output can be associated with the adjusted skill rating and the calculated effectiveness rating. An example of an effectiveness rating is illustrated in FIG. 12 and further discussed above with respect to FIG. 15.

Figure 17:
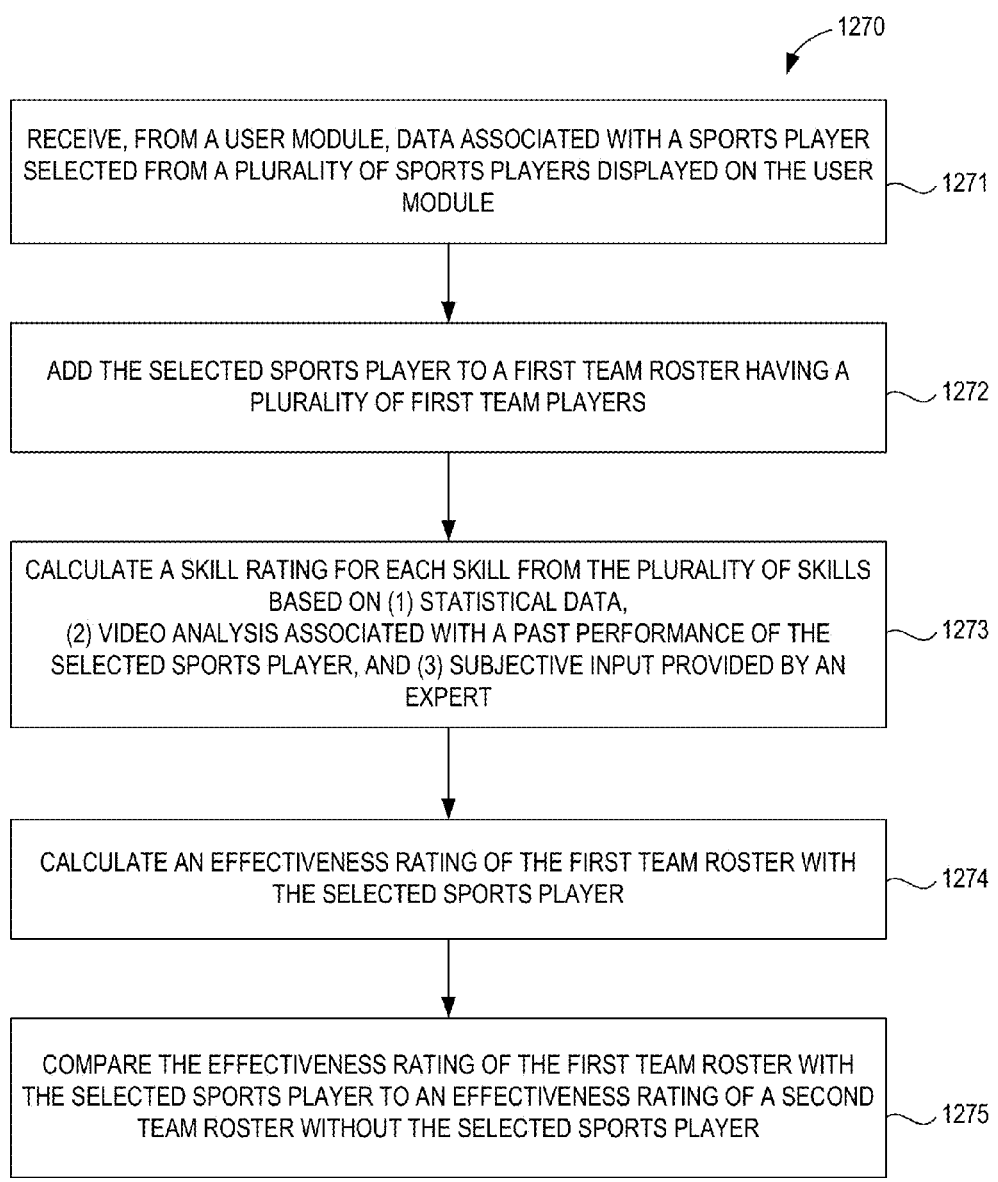
FIG. 17 is a flow chart illustrating a method for selecting a squad of fantasy sports players from a team roster using a predictive analysis system, according to an embodiment.

FIG. 17 is a flow chart illustrating a method 1270 for selecting a squad of fantasy sports players from a team roster using a predictive analysis system. The method includes receiving, from a user module, data associated with a sports player selected from a plurality of sports players displayed on the user module, 1271. The user module can be, for example, the user module 310 illustrated and described with respect to FIG. 6 or the coaching module 410 illustrated and described with respect to FIG. 7.

The selected sports player is added to a first team squad having a plurality of first team players, 1272. The selected sports player is associated with a plurality of skills that correspond to a position of the selected sports player on the first team squad. As used herein, the term "squad" can refer to and/or be synonymous with a lineup. The squad or lineup can be derived, for example, from a team roster. In the football context, examples of a squad or lineup can include a defensive team squad and/or an offensive team squad. In fantasy football, the positions that would make up the particular squad would be assigned to players from multiple football teams.

A skill rating is calculated for each skill from the plurality of skills based on (1) statistical data, (2) video analysis associated with a past performance of the selected sports player at the position, and (3) subjective input provided by an expert, 1273. Each skill rating calculated is used to predict a future performance of the selected sports player at the position. The skill ratings can be calculated in any manner discussed herein. In some embodiments, the skill rating calculated is not based on the video analysis associated with a past performance of the selected sports player at the position. In some embodiments, the subjective input includes an importance rating of that skill to the position of the player, a predicted strength rating of a corresponding offsetting skill of an opposing sports player at the future sporting event, and/or a predicted strength rating of a corresponding complementary skill of a first team player from the plurality of first team players at the future sporting event.

An effectiveness rating of the first team squad with the selected sports player is calculated, 1274. This effectiveness rating is calculated based on the skill ratings calculated for the selected sports player and skill ratings calculated for each first team player from the plurality of first team players.

The effectiveness rating of the first team squad with the selected sports player is compared to an effectiveness rating of a second team squad without the selected sports player to determine an optimum team squad for a future sporting event, 1275. In this manner, a coach, for example, can use the system to determine which defensive squad or lineup to play against an opponent in an upcoming game. In some embodiments, the "optimum" team squad is the squad with the higher effectiveness rating. For example, when the effectiveness rating of the first team squad is greater than the effectiveness rating of the second team squad, then the first team squad is designated the optimum team squad. In other embodiments, however, the squad designated as the "optimum" team squad does not have the higher or highest effectiveness rating. For example, the system can determine that the second team squad is the optimum team squad even if the second team squad has a lower effectiveness rating than the first team squad.

In some embodiments, the method can further include recommending play formations for the future sporting event based on skills ratings of sports players from the optimum team squad and skills ratings of sports players from an opposing team squad.

In some embodiments, the method can further include receiving data representative of a play formation from the user module. In this manner, the effectiveness rating of the first team squad can be calculated based on the skill ratings calculated for the selected sports player, the skill ratings calculated for each first team player from the plurality of first team players, and/or the play formations.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, the predictive analysis system includes functionality that allows user to incorporate their own, personal ratings of players without affecting the system data. For example, in some embodiments, the user interface 310 can allow a user to change the skill levels or other ratings that the system generated based on their personal subjective opinions about a player, opponent, skill, etc. The system can save the adjusted ratings separately from the data that the system uses to generate player performance predictions. The adjusted ratings could be, for example, associated solely with the user's account. In this manner, a user can tailor or customize the predictive analysis system to suit his personal needs.

In some embodiments, the predictive analysis system can include functionality to perform free agent trade analysis based, for example, on the skills of free agent players.

Although the predictive analysis system is illustrated and described above as generating player performance predictions based on calculated skill levels and other subjective data provided by experts/analysts, in other embodiments, the predictive analysis system can generate predictions that take into account scoring formats. For example, in generating a prediction for a fantasy football team owner, the system can consider the specific rules and/or scoring system of the fantasy league in which the team owner participates. In some embodiments, the user interface can allow a user to select a particular scoring system or, alternatively, manually enter the rules of the scoring system before the system generates the player performance prediction. In this manner, the predictions that are generated by the system are tailored to the particular needs of the user, thereby providing the user with more accurate data.

In some embodiments, the predictive analysis system can be maintained and/or operated by the same entity that provides a fantasy sports game system or league. In other embodiments, the predictive analysis system can be maintained and/or operated separately from such a gaming system or league. In some such embodiments, however, the predictive analysis system can be compatible with the gaming system or league such that the predictive analysis system can communicate with the gaming system or league to collect fantasy sports data from and/or download fantasy sports data to the gaming system.

In some embodiments, the server can include a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although various embodiments have been described as having particular features and/or combinations of components, other embodiments are possible having a combination of any features and/or components from any of the embodiments where appropriate.

What is claimed is:

1. A non-transitory processor-readable medium storing code representing instructions to be executed by a processor, the code comprising code to cause the processor to:

receive statistical data associated with a past performance of a player at a position at a past sporting event;

associate the player with a plurality of skills that correspond to the position of the player, each skill from the plurality of skills having a corresponding offsetting skill and a corresponding complementary skill;

calculate the predicted strength rating of the corresponding complementary skill for each skill from the plurality of skills based on a skill rating of a supporting player at the future sporting event and the received statistical data;

calculate a skill rating for each skill from the plurality of skills based on the received statistical data and subjective input provided by an expert, the subjective input including an importance rating of that skill to the position of the player, a predicted strength rating of the corresponding offsetting skill of that skill at a future sporting event, or the predicted strength rating of the corresponding complementary skill of that skill at the future sporting event; and send an output associated with the calculated skill ratings to an output module configured to display the output, the output being used to predict a future performance of the player at the position at the future sporting event.

2. The non-transitory processor-readable medium of claim 1, wherein the past performance is a first past performance, the past sporting event is a first past sporting event, the subjective input being a first subjective input provided by the expert based on the first past performance, the code further comprising code to cause the processor to:

receive statistical data associated with a second past performance of the player at the position at a second past sporting event, wherein the code to calculate the skill rating including code to calculate the skill rating for each skill from the plurality of skills based on the received statistical data associated with the first past performance, the received statistical data associated with the second past performance, the first subjective input, and a second subjective input provided by the expert based on the second past performance.

3. The non-transitory processor-readable medium of claim 1, the code further comprising code to cause the processor to:

calculate the predicted strength rating of the corresponding offsetting skill for each skill from the plurality of skills based on a skill rating of an opposing player at the future sporting event and the received statistical data.

4. The non-transitory processor-readable medium of claim 1, the code further comprising code to cause the processor to:

calculate an effectiveness rating for the player based on each skill rating calculated, the output being associated with the calculated skill ratings and the calculated effectiveness rating.

5. The non-transitory processor-readable medium of claim 1, wherein the statistical data includes data related to at least one of the past performance, a performance of another player at the past sporting event, a team performance, environmental factors, and play formations.

6. The non-transitory processor-readable medium of claim 1, wherein the code to calculate the skill rating includes code to calculate the skill rating for each skill from the plurality of skills based on the received statistical data, subjective input provided by the expert, and a selected fantasy team scoring system.

7. A non-transitory processor-readable medium storing code representing instructions to be executed by a processor, the code comprising code to cause the processor to:

calculate a plurality of skill ratings for a player based on data associated with a first past performance of the player including statistical data and subjective input provided by an expert, each skill rating from the plurality of skill ratings corresponding to a skill of the player at a position;

after calculating the plurality of skill ratings for the player, receive statistical data associated with a second past performance of the player at the position;

calculate a predicted strength rating of a corresponding complementary skill for each skill from the plurality of skills based on a skill rating associated with a skill of another player at a future sporting event and the received statistical data;

adjust a skill rating from the plurality of skill ratings calculated for the player based on the received statistical data, the calculated predicted strength rating and subjective input associated with the second past performance provided by the expert, the subjective input associated with the second past performance including an offset skill rating associated with a skill of another player and a complementary skill rating associated with a skill of another player; and send an output associated with the adjusted skill rating to a user module configured to display the output, the output being used to predict a future performance of the player at the position.

8. The non-transitory processor-readable medium of claim 7, wherein the player is a fantasy sports player, the sending includes sending the output to the user module when the player is selected from a plurality of fantasy sports players displayed on the user module.

9. The non-transitory processor-readable medium of claim 8, the code further comprising code to cause the processor to:

add the player to a fantasy team roster when the player is selected from the plurality of fantasy sports players displayed on the user module.

10. The non-transitory processor-readable medium of claim 7, wherein the user module is a third-party fantasy sports website.

11. The non-transitory processor-readable medium of claim 7, wherein the received statistical data includes data related to at least one of the second past performance, a performance of another player, a team performance, environmental factors, and play formations.

12. The non-transitory processor-readable medium of claim 7, the code further comprising code to cause the processor to:

calculate an effectiveness rating for the player based on each adjusted skill rating, the output being associated with the adjusted skill rating and the calculated effectiveness rating.

* * * * *